C. Murdock,
Saw Teeth,
N° 85,021.                    Patented Dec. 15, 1868.
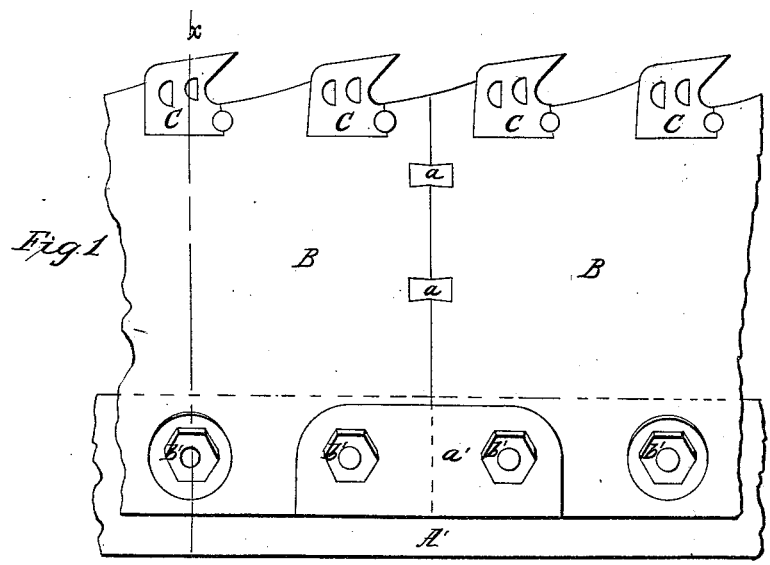
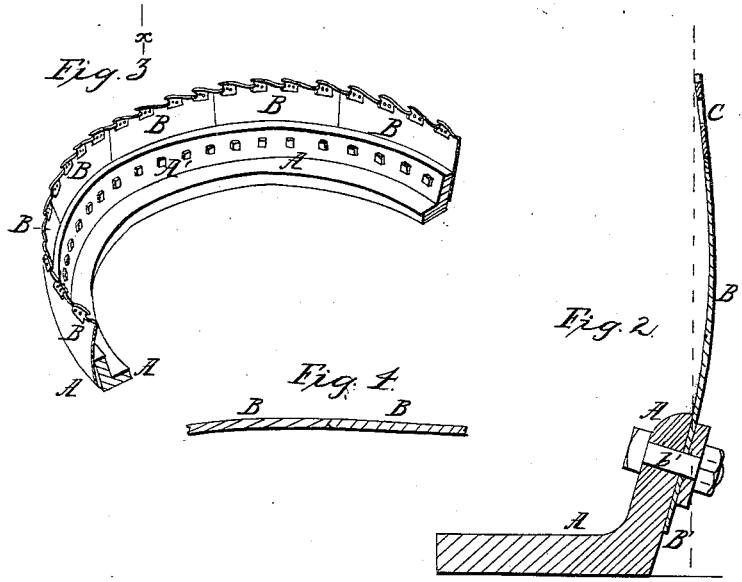
Witnesses.
J. Snowden Bell.
Henry N. Myggatt
Inventor.
Charles Murdock
By N. Cranford his attorney

CHARLES MURDOCK, OF HARTFORD, CONNECTICUT.

Letters Patent No. 85,021, dated December 15, 1868.

IMPROVEMENT IN CYLINDRICAL SAW.

The Schedule referred to in these Letters Patent and making part of the same.

*To all whom it may concern:*

Be it known that I, CHARLES MURDOCK, of Hartford, in the county of Hartford, and State of Connecticut, have invented a new and improved Cylindrical Saw, for sawing staves; and I do hereby declare that the following is a full, clear, and exact description of the construction and use of the same, reference being had to the annexed drawings, making a part of this specification, in which—

Figure 1 is a broken section of the saw, showing the manner of putting the different sections of the cylinder together, and the attachment of the saw to its holding-disk;

Figure 2 is a transverse cross-section of the saw and its holding-disk, showing its transverse curvature;

Figure 3 is a section in perspective of the saw and disks; and

Figure 4 is a broken section of the saw, showing how the plate-sections that form the cylinder are joined together.

Many attempts have been made to construct a cylindrical or circle-saw that would saw, from a bolt of wood of proper length and thickness, a stave that should, when sawed, be in proper shape to form a barrel or cask, that is, a stave having a transverse convex curvature on the outside, to correspond to the circle of the barrel at the bilge, and the inside concave to correspond to the inner circle of the barrel, but every such attempt has failed where the saw was made from a single slab of steel.

My present invention obviates the difficulty heretofore encountered, and it is a success; and It consists in the construction of a cylindrical saw made in sections, the peculiar method employed in joining and confining the sections of the saw together, and in the use of insertible teeth in such cylindrical saw.

The great advantage in my construction of saws over other construction, is in making the blade in sections, instead of in a continuous plate; in the perfection in which such sections can be bent, to form a longitudinal and transverse curvature with relation to the saw; and in having the teeth insertible in such saw.

In the drawings—

A represents a circular disk, to which the saw is attached. The part or flange A' is constructed so that the outside face conforms to the inner diameter as well as the transverse curvature of the saw, and to which the saw is made fast by bolts $b$, or by any secure method. The disks A may be made of cast or wrought-iron, or of any other material that will answer the purpose.

B represents a section of the saw, and is constructed with two curvatures, one in the longitudinal direction of the saw, and the other a transverse curvature with relation to the saw.

B B, in fig. 1, show how two sections of the saw are joined together and secured, which is by making a groove in one edge of a section, and a rib on the other, so that the rib on one section fits into the V-shaped groove in the other, as seen in section, fig. 4, of drawings, and when the several sections that form a complete circle and saw are thus united, the scores or dovetail pieces $a$ are inserted across the joints of the sections, and the plate $a'$, with bolts $b'$, is used to secure the whole upon the flange A' of the disk A.

C C are insertible teeth.

The saw, as a whole, is constructed from sections B B, and made into a perfect circle upon flange A', while it is transversely curved, as seen in fig. 2, so that the diameter of the saw at its cutting-edge is the same as at the lower edge of the flange A', while at its upper edge, at point B', its diameter is less than at the lower edge of the flange, or at the cutting-edge of the saw, as the dotted line fully shows in said fig. 2.

This peculiar form is important, in order to have the working-part of the saw, which is below the flange, of a uniform curve, to allow the saw to cut its way clear in the bolt of wood, that may be presented upon a vibrating table, hinged within the circle, and above the lower edge of the saw, so that the kerf would be convex on one side and concave on the other, a form necessary in forming staves.

The insertible teeth C, with the two curvatures, to correspond with the curvature of the saw-blade, is essential to the perfect working of the saw, because the saw is difficult to construct perfectly and have the teeth cut from the solid plate, because, if so cut, when a little worn, the diameter of the saw would be changed on its cut, and destroy its usefulness; while, in using the insertible teeth, when so worn, they will be taken out and new ones used in their place, fully restoring the saw to its primitive condition, without any change in the body of the saw, or disturbing its fastening upon the flange A'.

The insertible teeth C are constructed to be wider on their cut than the thickness of the saw-blade, or the teeth at its inner diameter, so that it needs no set in order to cut free in the wood, which would not be the case if the saw were made without insertible teeth.

I am aware that circle or cylindrical saws have been before used where the sides of the saw were on straight lines. I am also aware that attempts have been made to form such saw from a single slab of steel, and bending it into proper shape after being so constructed, as is seen in my patent of June 19, 1866, but such attempt failed of its object and success.

What I do claim, and desire to secure by Letters Patent, is—

1. A cylindrical or circle-saw, composed of sections B B, having teeth C, and a longitudinal and transverse curvature, and secured together, and to flange A', in the manner and for the purpose substantially as described.

2. A cylindrical or circle-saw, with insertible teeth C, having two curvatures, one longitudinal and the other transverse to the blade of the saw, when constructed substantially in the manner as set forth.

CHARLES MURDOCK.

Witnesses:
H. C. ROBINSON,
C. N. SHIPMAN.